(12) United States Patent
Chen

(10) Patent No.: US 7,090,452 B2
(45) Date of Patent: Aug. 15, 2006

(54) TAPPING SCREW

(76) Inventor: Ho-Tien Chen, P.O. Box 2-10, Tainan City (TW)

( * ) Notice: Subject to any disclaimer, the term of this patent is extended or adjusted under 35 U.S.C. 154(b) by 0 days.

(21) Appl. No.: 10/356,445

(22) Filed: Jan. 28, 2003

(65) Prior Publication Data

US 2004/0146377 A1 Jul. 29, 2004

(51) Int. Cl.
*F16B 25/10* (2006.01)
(52) U.S. Cl. .................................................. 411/378.1
(58) Field of Classification Search ...... 411/386–387.8
See application file for complete search history.

(56) References Cited

U.S. PATENT DOCUMENTS

| | | | | |
|---|---|---|---|---|
| 3,094,894 A | * | 6/1963 | Broberg | 411/387.4 |
| 3,665,801 A | * | 5/1972 | Gutshall | 411/387.7 |
| 4,028,987 A | * | 6/1977 | Wilson | 411/387.2 |
| 4,386,882 A | * | 6/1983 | Bereiter | 411/387.1 |
| 4,480,951 A | * | 11/1984 | Regensburger | 408/224 |
| 5,190,425 A | * | 3/1993 | Wieder et al. | 411/29 |
| 6,887,023 B1 | * | 5/2005 | Lu et al. | 411/387.1 |

\* cited by examiner

*Primary Examiner*—Flemming Saether
(74) *Attorney, Agent, or Firm*—J.C. Patents

(57) ABSTRACT

A tapping screw includes a head, a shank and a cutting member, Said the shank has male threads, and the cutting member extends down from the shank and has a plurality of cutting grooves lengthwise formed and/or a plurality of wings also lengthwise formed; an annular groove is further provided between the shank and the cutting groove for wood waste cut out of a drilled hole of an object to move out smoothly and quickly, so the sharpness of the cutting member and the pointed end may be kept usual, and resistance against drilling and fixing of the screw may be reduced.

4 Claims, 9 Drawing Sheets

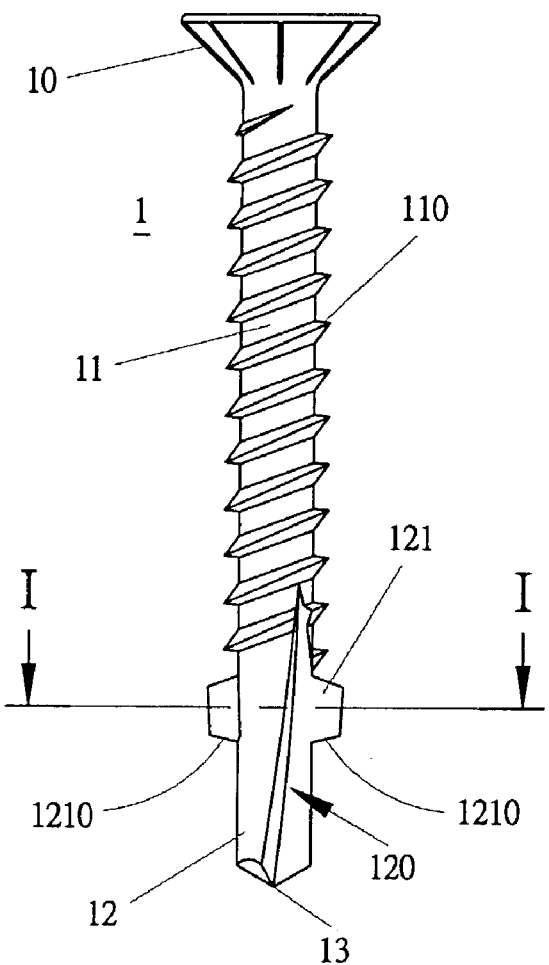
FIG 1 (PRIOR ART)
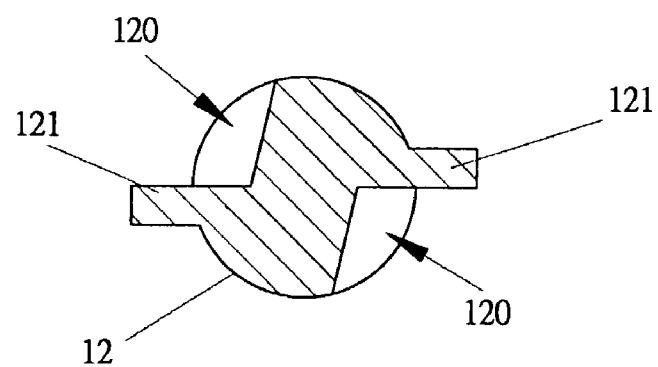
FIG 2 I-I (PRIOR ART)

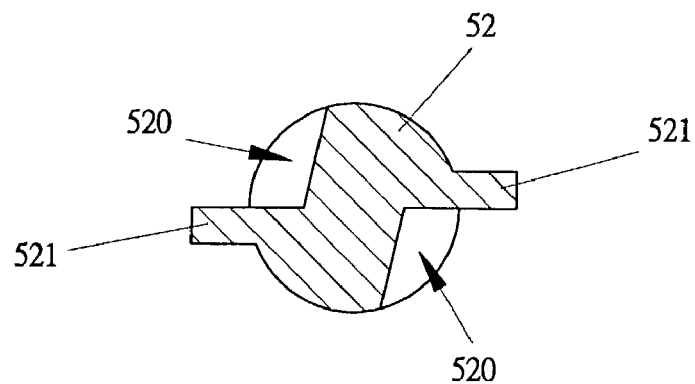
FIG 9 (II-II)
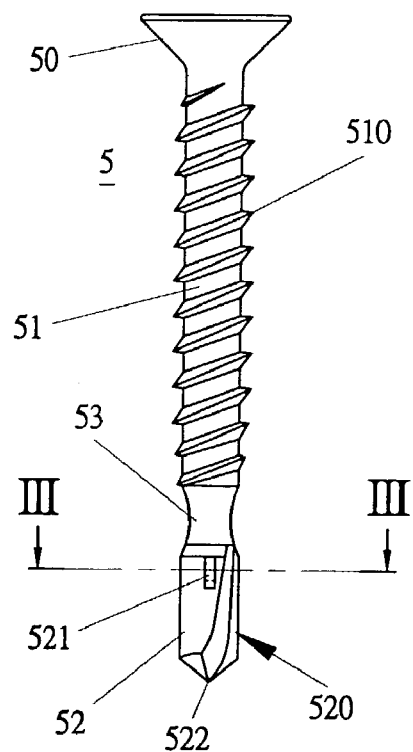
FIG 10
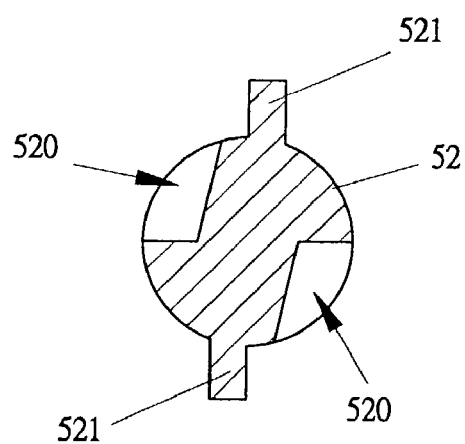
FIG 11 (III-III)

TAPPING SCREW

BACKGROUND OF THE INVENTION

1. Field of the Invention

This invention relates to a tapping screw, particularly to one possible to force cut wood waste move out of an object being fixed, and to shorten a cutting member as possible, and to elevate fixing force of a screw.

2. Description of the Prior Art

A first conventional tapping screw 1 shown in FIGS. 1 and 2, includes a head 10, a shank 11 provided with male threads 110, a cutting member 12 provided with a plurality of cutting grooves 120 and a plurality of wings 121 projecting outward from the outer surface of the cutting member 12. The wings 121 are formed in parallel vertically to the cutting grooves 120 so that the cutting member may be formed with one round of process. The wings 121 respectively have an inclined cut surface 1210 respectively formed at its lower side.

A second conventional tapping screw 2 shown in FIG. 3 includes a head 20, a shank 21, and cutting member 22. The cutting member 22 has a plurality of cutting grooves 220 vertically formed, and a plurality of wings 221, but the wings 221 are not parallel to the cutting grooves 220, so the cutting grooves 220 and the wings 221 needs a separate process, that is, two processes for forming, resulting in high cost.

A third conventional tapping screw shown in FIG. 4 includes also a head, a shank, and a cutting member 32, which is especially elongate, forming a plurality of cutting grooves 320 elongate for containing cut wood waste therein.

The common disadvantage of the three kinds of conventional tapping screw mentioned above is that the cutting grooves are located in the lower end portion of a screw, regardless of the cutting grooves being long or short. Then in drilling and fixing a screw on an object as shown in FIG. 5, wood waste 41 coming from a drilled hole 40 moves upward along the cutting grooves 13, 23 or 33 as shown respectively in FIGS. 1, 3 and 4, exhausted out of the opening 400 of the drilled hole 40. Then wood waste in the cutting grooves may gradually be piled more and more in accordance with the space of the cutting grooves becoming smaller and smaller (the upper portion becomes smaller the lower portion), due to the wood waste continually produced. The sharpness of the outer edges of the cutting grooves and the pointed ends decreases gradually, blocked by the wood waste therein so that the screw may be impossible to pass through an object such as a steel plate 42.

As seen in FIGS. 1 and 4, the conventional tapping screw have the wings 121, 221 321 provided with the inclined surfaces 1210, 2210, 3210, which may function to cut the drilled hole 420 of a steel plate to a larger hole to form a trumpet-like hole 421. Then only a small portion instead of the whole portion of the male threads can engage with the hole 420, resulting in insufficient force of fixing of the screw with an object.

SUMMARY OF THE INVENTION

The invention has been devised to offer a tapping screw having function of smooth exhaust of cut wood waste and original cutting sharpness and strong force of fixing an object firmly.

The invention is intended to have the following features.

1. An annular groove is provided between a shank and a cutting member so as to get rid of cut wood waste by cutting grooves smoothly out of the drilled hole.
2. The cutting member is made as shorter as could be than the conventional screws with a pointed end so as to smooth exhausting of cut wood waste.
3. One or two processes form the cutting member.

BRIEF DESCRIPTION OF DRAWINGS

This invention will be better understood by referring to the accompanying drawings, wherein:

FIG. 1 is a side view of a first conventional tapping screw;

FIG. 2 is a cross-sectional view of the first conventional tapping screw;

FIG. 9 is a cross-sectional view of the II—II line in FIG. 8;

FIG. 10 is a side view of a second embodiment of a tapping screw in the present invention;

FIG. 11 is a cross-sectional view of the III—III line in FIG. 10;

DETAILED DESCRIPTION OF THE PREFERRED EMBODIMENT

Figure 3:
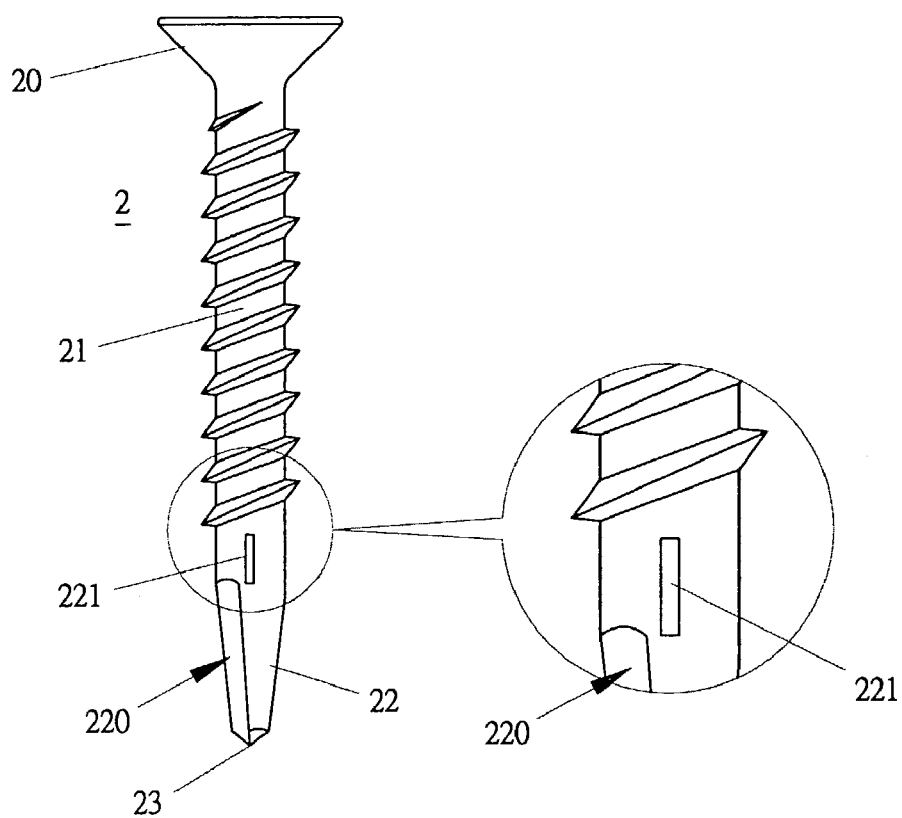
FIG. 3 is a side and a partial magnified view of a second conventional tapping screw.
Figure 4:
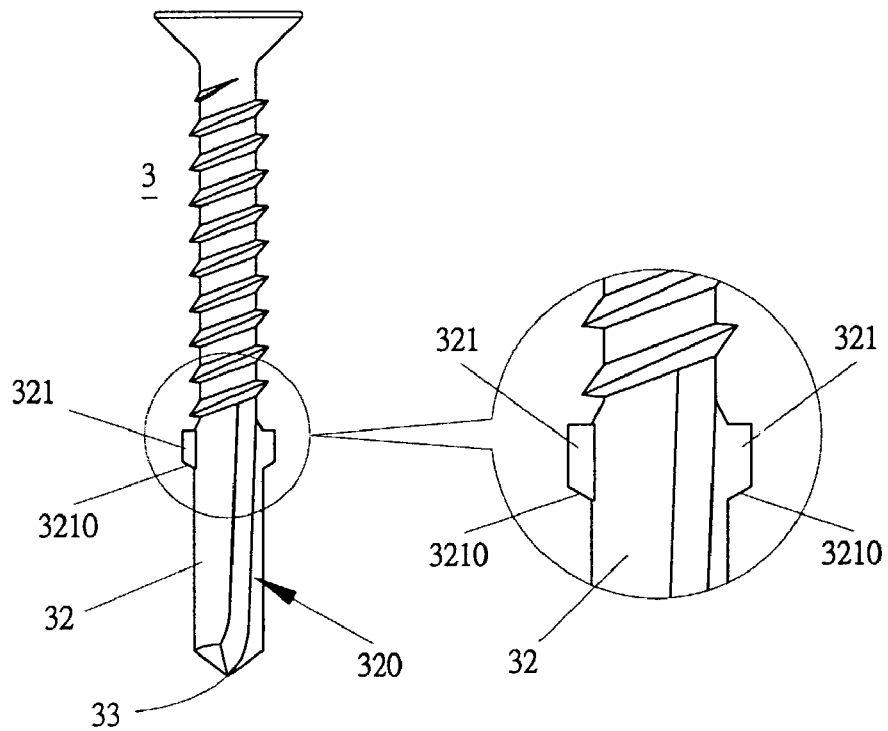
FIG. 4 is a side and a partial magnified view of a third conventional tapping screw.
Figure 5:
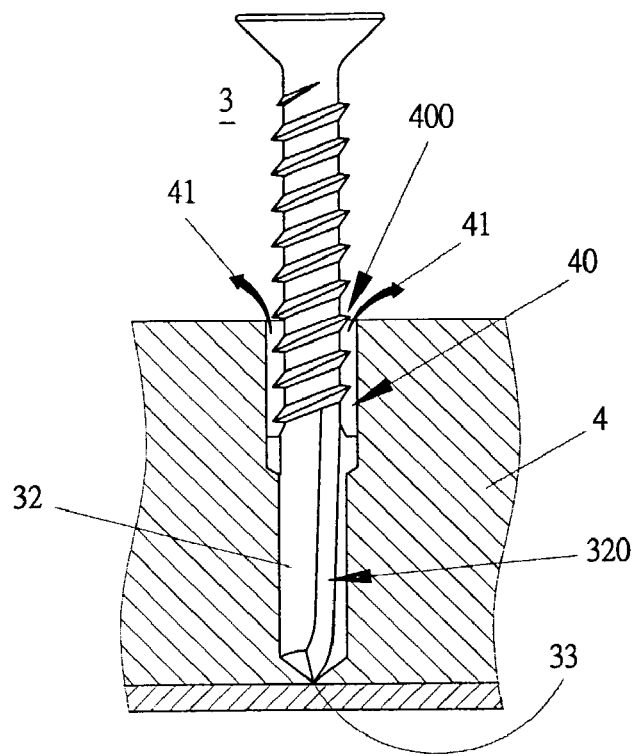
FIG. 5 is a cross-sectional view of the conventional screw, showing the screw at the beginning stage of drilling a hole in a wood.
Figure 6:
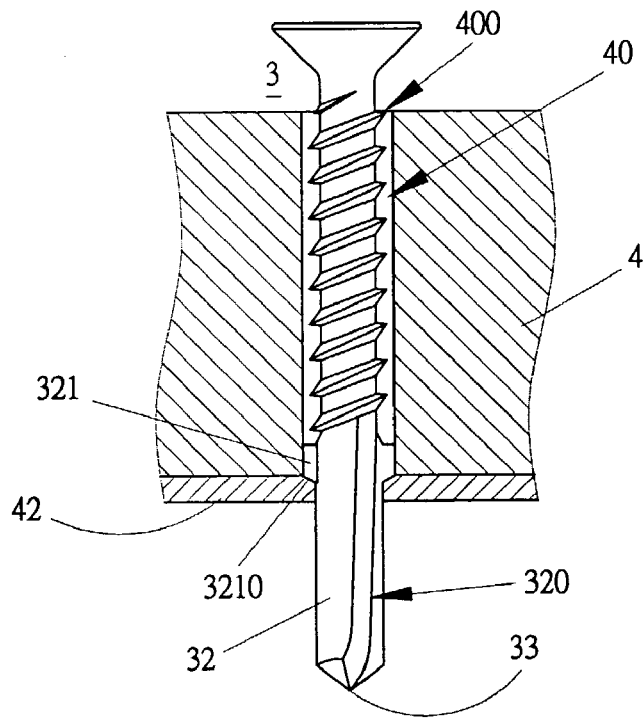
FIG. 6 is a cross-sectional view of the conventional screw, showing the screw at the beginning stage of the wings contacting a steel plate.
Figure 7:
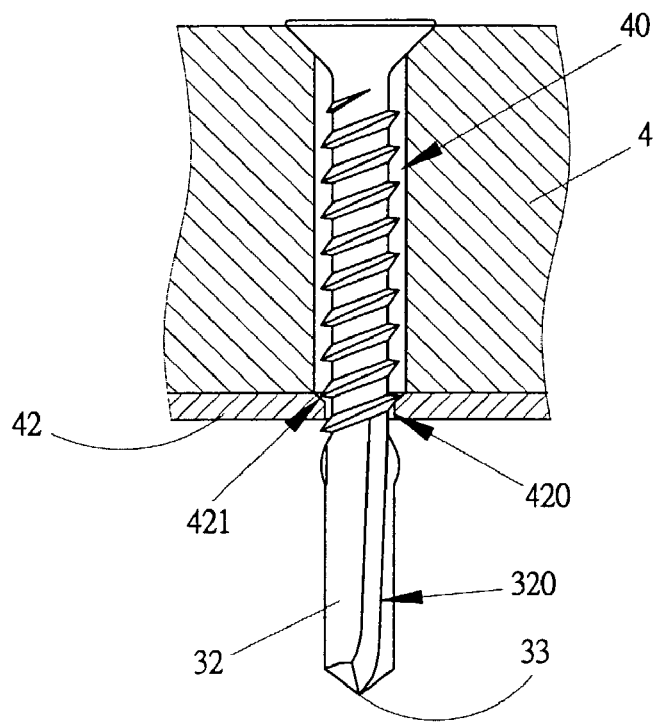
FIG. 7 is a cross-sectional view of the conventional screw fixing a steel plate.
Figure 8:
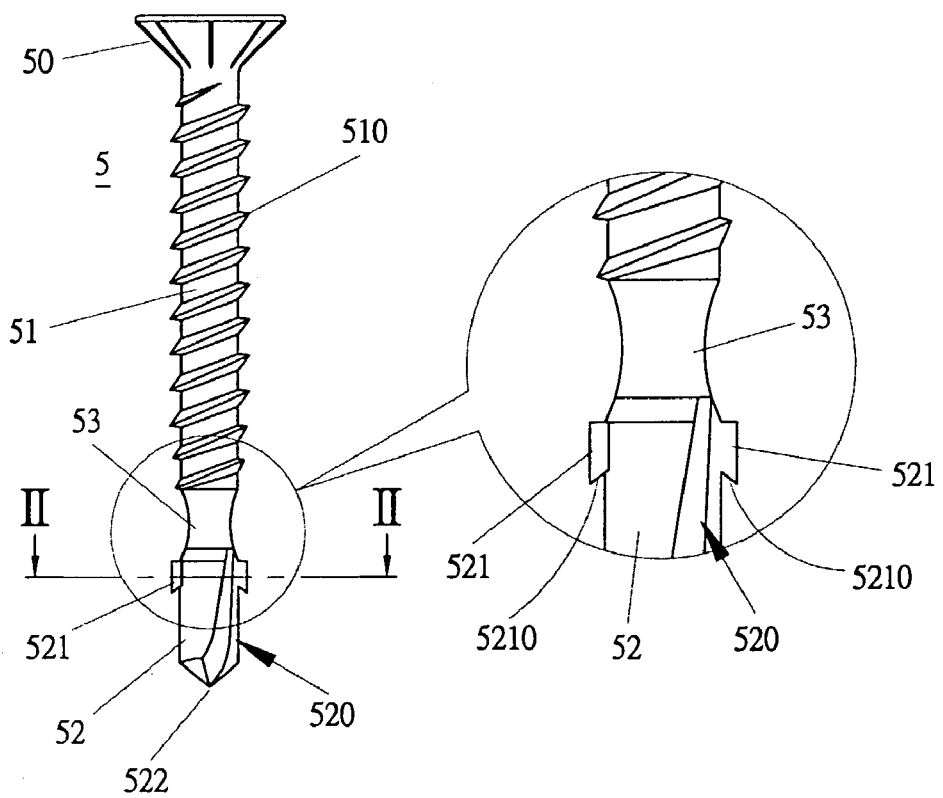
FIG. 8 is a side and a partial magnified view of a first embodiment of a TAPPING SCREW in the present invention.
Figure 15:
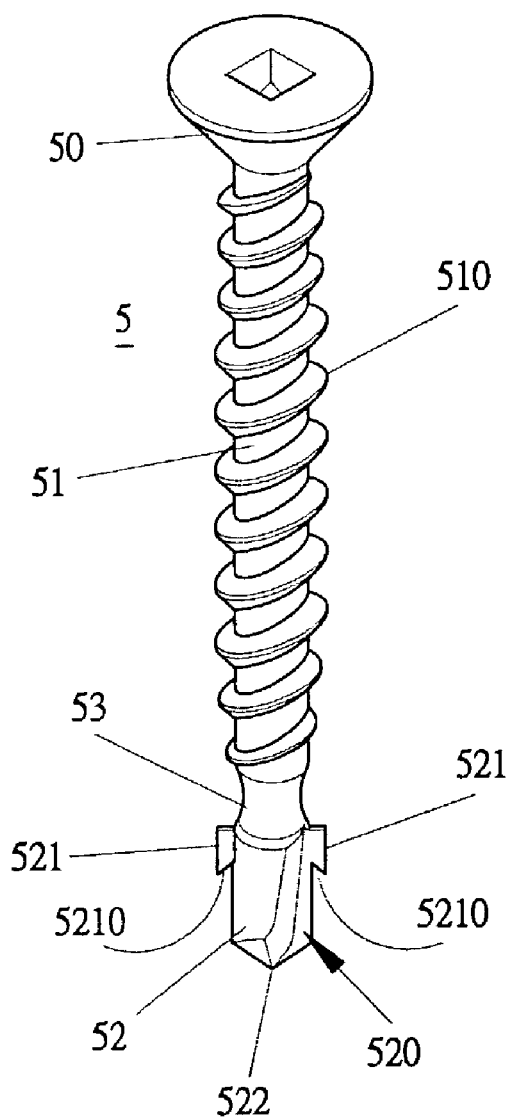
FIG. 15 is a side view of a tapping screw in the present invention.

A first preferred embodiment of a tapping screw in the present invention, a shown in FIGS. 8, 9 and 15, includes a head 50, a shank 51 extending down from the head 50, and a cutting member 52 extending down from the shank 51.

The shank 50 has male threads 510.

The cutting member 52 is provided with a plurality of cutting grooves 520 and a plurality of wings 521 located parallel to the cutting grooves 520 to enable the cutting member 52 formed by only one process. Or as shown in FIGS. 10 and 11, a second embodiment of a tapping screw in the present invention has the cutting grooves 520 and the wings 521 formed in non-parallel to each other, which are then formed by two processes instead of one. Further, the wings 521 have an inclined surface 5210 formed in a lower side.

Figure 12:
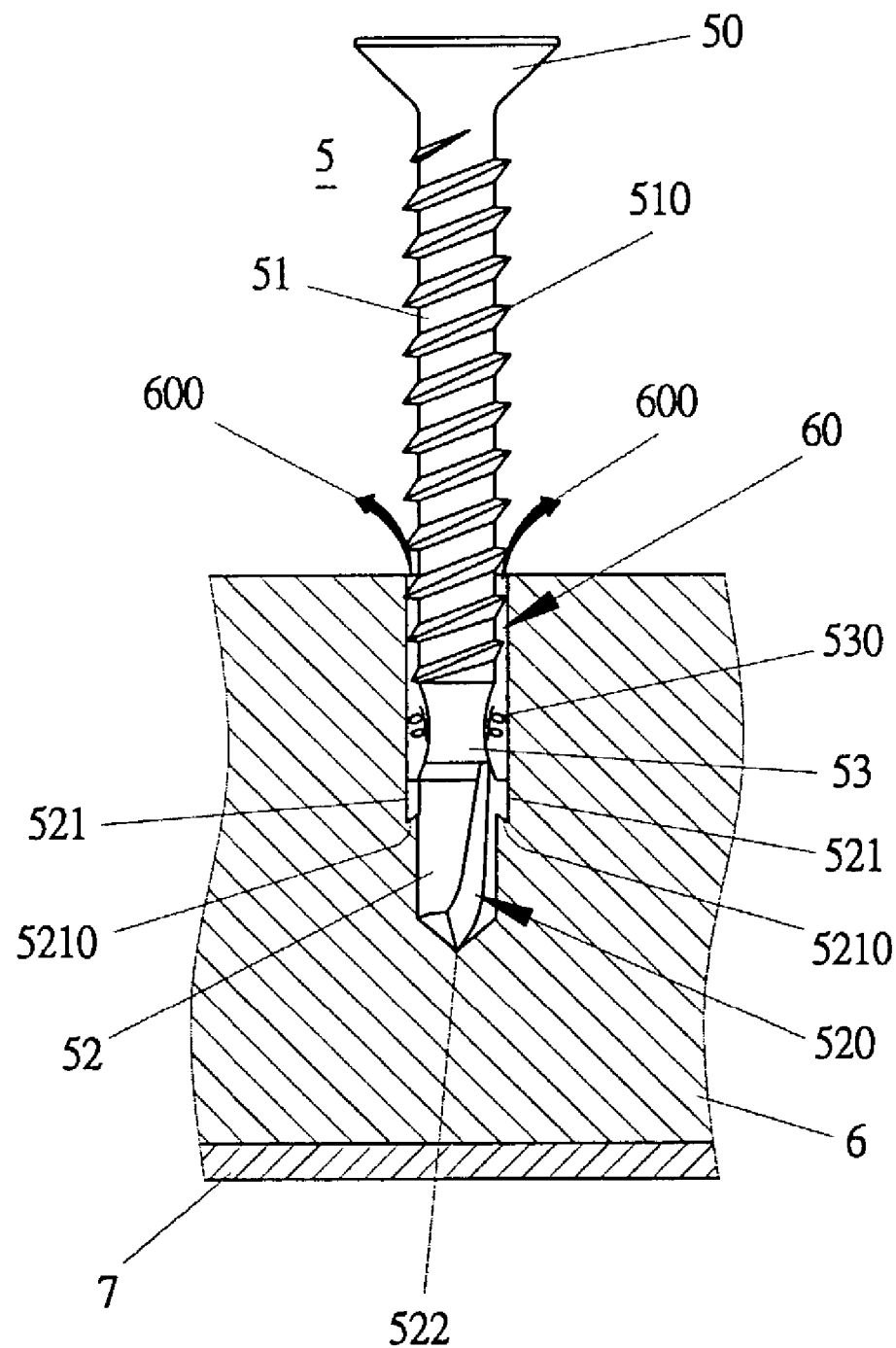
FIG. 12 is a cross-sectional view of the tapping screw in the present invention, showing it in a first stage of fixing an object.

In addition, an annular groove 53 is provided between the shank 51 and the cutting member 52 for a large volume of cut wood waste 530 to easily and quickly move out of a drilled hole in fixing action of the screw. Then the screw 5 in the invention can force wood waste 600 coming from a drilled hole 60 of a wood board (or an object to be fixed) to move from the cutting groove 520 to the annular groove 53 and then exhausted out, as shown in FIG. 12. Therefore cut wood waste may not accumulate in the cutting groove 520, keeping keen sharpness of the edges of the cutting groove 520 and the pointed end to enable an electric driver hold a proper torque for smoothly driving the screw of the invention.

Figure 16:
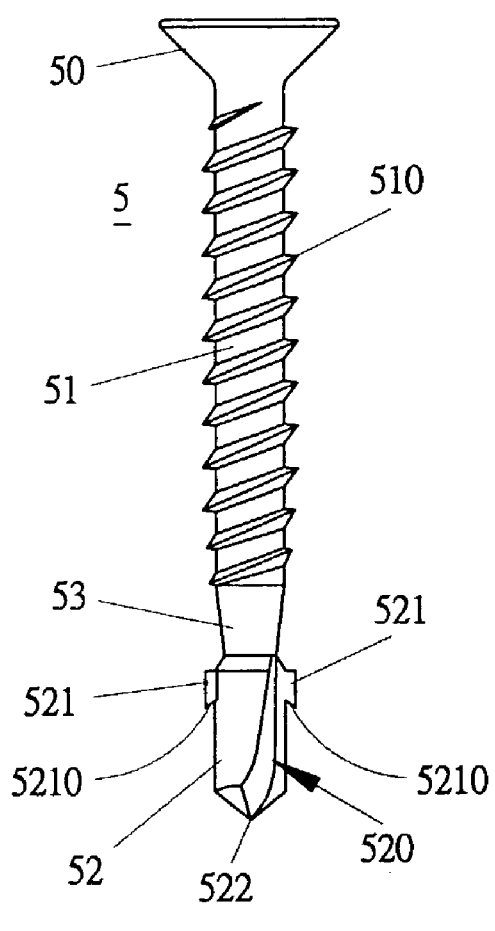
FIG. 16 is a side view of a third embodiment of a tapping screw in the present invention.
Figure 17:
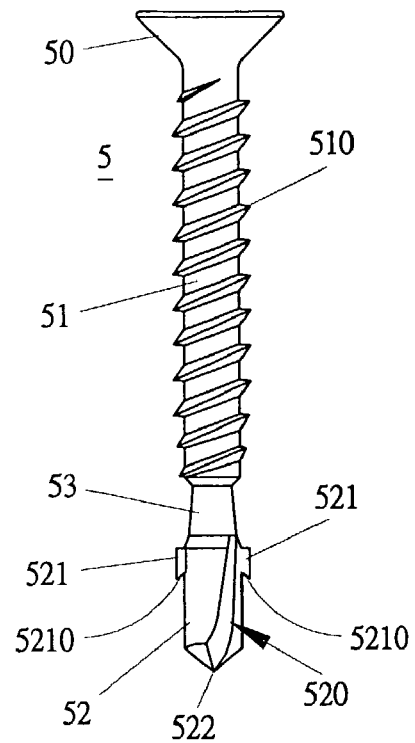
FIG. 17 is a side view of a fourth embodiment of a tapping screw in the present invention.

A third embodiment of a screw in the invention shown in FIG. 16 has an annular groove 53 for exhausting wood waste formed to be shaped as a cone with a wide upper portion and a narrow lower portion. And a fourth embodiment of a screw in the invention shown in FIG. 17 has a cone-shape with a narrow upper portion and a wide lower portion. These two embodiments also has the same function for exhausting wood waste as good as the first to third embodiments.

Figure 13:
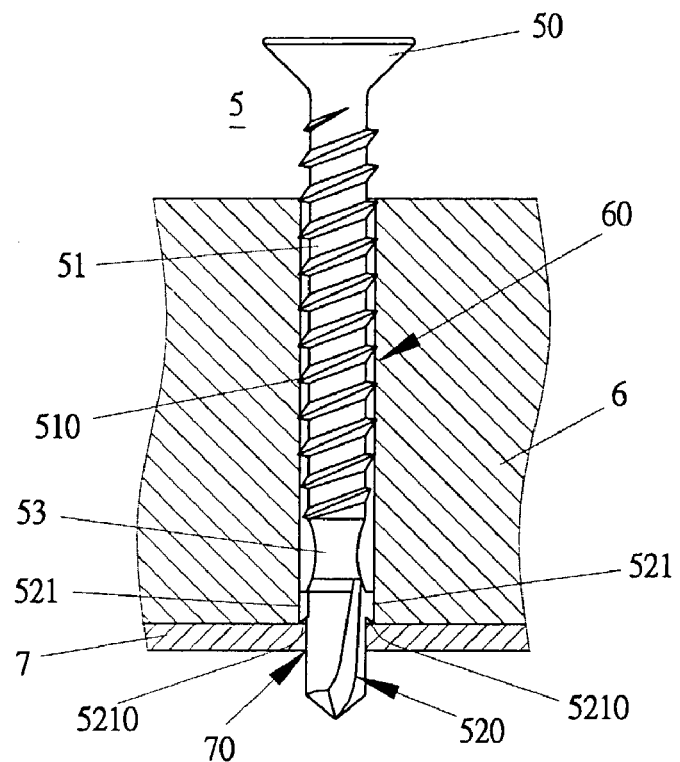
FIG. 13 is a cross-sectional view of the tapping screw in the present invention, showing it in a first stage of contacting a steel plate.
Figure 14:
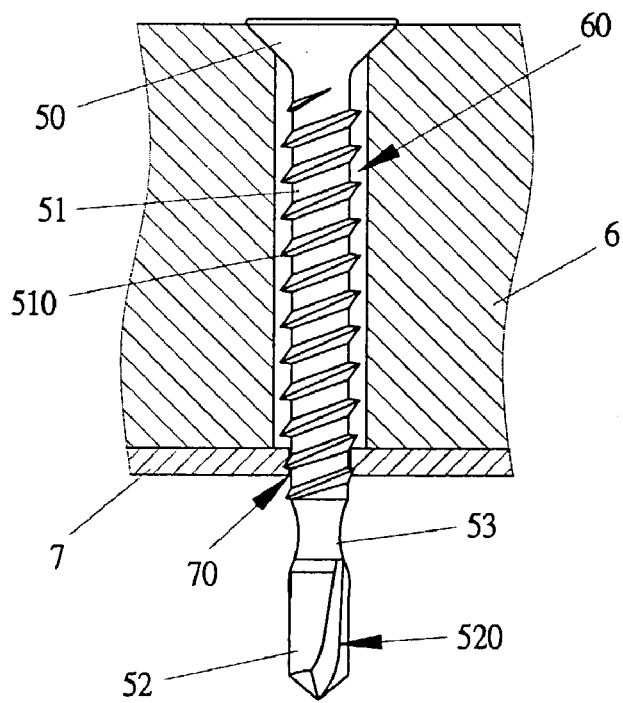
FIG. 14 is a cross-sectional view of the tapping screw in the present invention, showing it completely fixing a steel plate.

After the cutting member 52 of the screw 5 passes through a steel plate 7, as shown in FIG. 13, the inclined surfaces 5210 of the wings 521 may come to collide with the steel plate to be broken off the screw 5 so that wings 521 may not give any harm to the drilled hole 70, keeping tight fixing of the screw 5 with the steel plate 7, as shown in FIG. 14.

Figure 18:
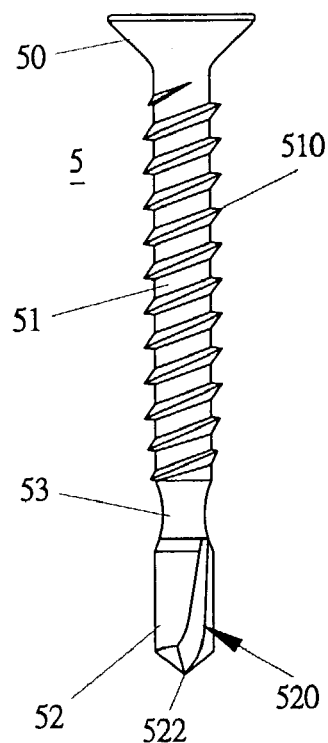
FIG. 18 is a side view of a fifth embodiment of a tapping screw in the present invention.
Figure 20:
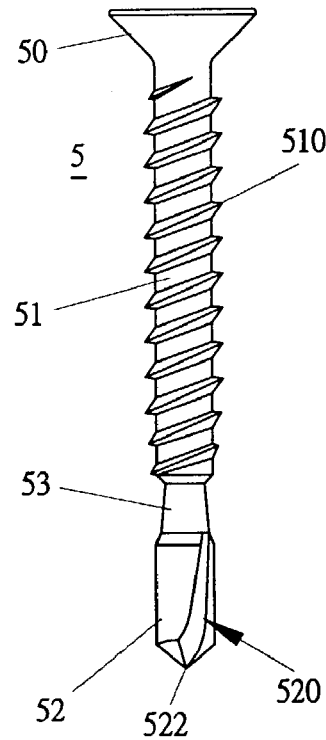
Figure 19:
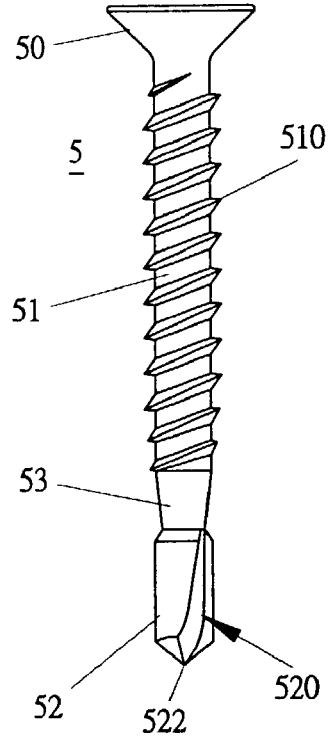
FIG. 19 is a side view of a sixth embodiment of a tapping screw in the present invention; and, FIG. 20 is a side view of a seventh embodiment of a tapping screw in the present invention.

Next, FIGS. 18, 19 and 20 respectively show a fifth, a sixth and a seventh embodiment of a screw in the invention, all including a head 50, a shank 51 with male threads 510 and a cutting member 52.

The cutting member 52 is provided with a plurality of cutting grooves 520, and an annular groove 53 is provided between the shank 51 and the cutting member 52 for a large volume of wood waste 530 to move in quickly. Therefore, in fixing a screw 5 in the invention, cut wood waste 600 from the drilled hole 60 may be moved from the cutting grooves 520 into the annular groove 53 to be exhausted out so cut wood waste may not remain in a large quantity in the cutting grooves to dull keen sharpness of the edges of the cutting member and the pointed end.

Further, the sixth embodiment shown in FIG. 19 can be formed to have the annular groove 53 with a wide upper portion and a narrow lower portion. Or the annular groove 53 can be formed as shown in FIG. 20 illustrating the seventh embodiment, having a narrow upper portion and a wide lower portion. These two embodiments all have a merit of permitting an electric driver hold a proper torque for driving the screw in the invention.

While the preferred embodiments of the invention have been described above, it will be recognized and understood that various modifications may be made therein and the appended claims are intended to cover all such modifications that may fall within the spirit and scope of the invention.

What is claimed is:

1. A tapping screw comprising:
   a head, a shank extending down from said head and having male threads, and a cylindrical cutting member extending down from said shank, said cutting member provided with a plurality of lengthwise cutting grooves and a plurality of lengthwise wings projecting out from said cutting member, an annular groove provided between said shank and said cutting member, said annular groove serving for a large volume of wood waste cut to move in from a drilled hole in an object being screwed in by said screw so that cutting capacity of said screw may be kept as usual and torque required for fixing said screw may be reduced;
   wherein said wings of said cutting member are formed as generally flat members on an outer surface of the cutting member, a diameter of said cylindrical cutting member is larger than a diameter of said annular groove, wherein one end of each of the cutting grooves starts from a tip of the cutting member and the other end of each of the cutting grooves extends into the annular groove, and each of the cutting grooves includes a smooth continuous surface extending from the tip to the annular groove.

2. The tapping screw as claimed in claim 1, wherein said annular groove is shaped as a cone.

3. The tapping screw as claimed in claim 1, wherein said wings are so made that when said wings collide with a metal plate in a process of driving the tapping screw into the metal plate, said wings will break off from the cutting member.

4. The tapping screw as claimed in claim 1, wherein said wings of said cutting member have an inclined surface at their lower end as viewed from the head of the tapping screw, so that one end of the inclined surface said wings that is away from the shank is lower than, the other end of the inclined surface that is closer to the shank.

* * * * *